Figure 1:
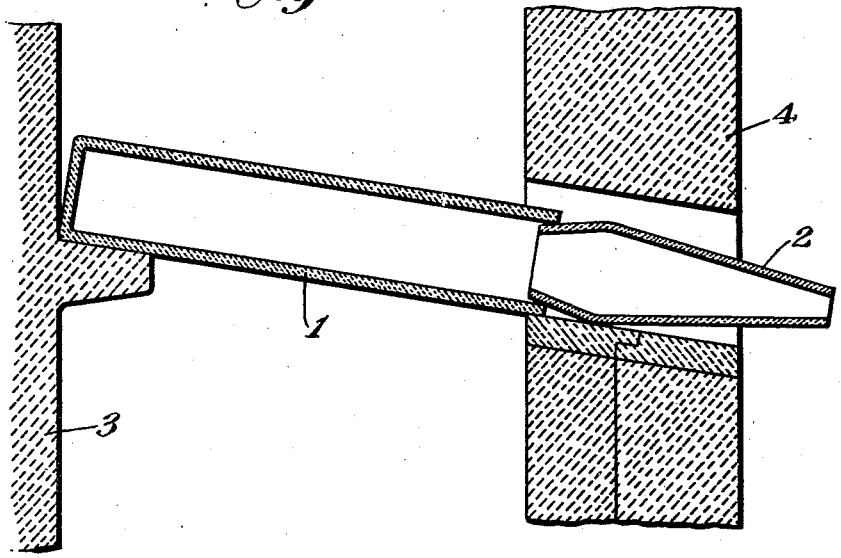

Oct. 9, 1934.   A. L. J. QUENEAU   1,975,800
MANUFACTURE OF PRESSURE MOLDED REFRACTORY ARTICLES
Filed March 15, 1932

INVENTOR
AUGUSTIN LEON JEAN QUENEAU
BY
ATTORNEYS

Patented Oct. 9, 1934

1,975,800

UNITED STATES PATENT OFFICE 1,975,800

MANUFACTURE OF PRESSURE MOLDED REFRACTORY ARTICLES

Augustin Leon Jean Queneau, New York, N. Y.

Application March 15, 1932, Serial No. 599,014

18 Claims. (Cl. 25—156)

This invention relates to refractory articles and more particularly to pressure molded refractory articles such as zinc retorts, condensers, crucibles and the like and to methods of manufacturing the same.

Heretofore in the art it has been customary to manufacture many refractory articles by pressure molding methods. In such methods the refractory materials comprising the article are made up into a plastic or semi-plastic mass and are shaped to the desired size, shape and configuration under pressure. Thereafter the article is thoroughly dried and is then fired to elevated temperatures to frit the refractory materials together. It is essential to remove all of the moisture content of the pressure formed article prior to the firing operation. The moisture content of some types of refractory admixtures such as those adapted to be used in the forming of zinc retorts, condensers and the like is removed with difficulty and only after a prolonged and carefully controlled drying operation.

One of the objects of the present invention is to facilitate and to accelerate the removal of the moisture content of pressure molded refractory articles.

Another object of the present invention is to improve the manufacture of zinc retorts, condensers, crucibles and the like.

Still another object of the present invention is to provide an improved method of glazing the surface of pressure molded refractory articles.

Other objects and advantages will become apparent as the invention is more fully disclosed.

In accordance with the objects of the present invention I have found that the removal of the moisture content of pressure molded refractory articles is facilitated and accelerated when hygroscopic salts are present upon the surface of the article. The method of applying these salts to the surface of the article may vary widely. Preferably, the hygroscopic salts are incorporated within the refractory article prior to forming in such manner that during the drying operation they may accumulate upon the surface of the article. Alternatively they may be applied directly to the surface of the article after forming either as a highly concentrated (aqueous or organic) salt solution or as a finely divided dust or powder.

I have found that in the ordinary drying operation where the pressure molded article is subjected to circulating air at slowly rising temperatures, the presence of hygroscopic salts upon the surface of the drying article accelerates the normal rate at which the moisture within the interior of the article is drawn to the surface by capillary action. Where the pressure formed article is comprised of relatively finely divided refractory materials and is relatively dense in structure as is the case of zinc retorts and condensers, crucibles and the like, the effect produced by the use of hygroscopic salts in accordance with the present invention, upon the time interval required to obtain complete removal of moisture during the drying operation, is marked.

I have also found that hygroscopic salts may be utilized to obtain other desirable and beneficial results in addition to that obtainable in the removal of moisture such as, for example, to facilitate and to improve the admixing of the plastic mass of refractory material from which the pressure molded article is shaped. Such salts also may be utilized as glazing agents. Other benefits may also arise from their use and application of hygroscopic salts in accordance with the present invention.

As a specific embodiment of the practice of the present invention, the adaptation of the same to the manufacture of zinc retorts will be described. Zinc retorts are elongated, cartridge-shaped containers closed at one end, open at the other end and are comprised of refractory materials. It is highly essential that the refractory material comprising the retort be substantially inert with respect to zinc either when molten or when in the vapor state. It is also essential that the retort be substantially impervious to gases, metal vapors or to molten zinc. Furthermore, due to the method of supporting the retort in a retorting furnace during its service life the retort must have relatively high static strength at the elevated retorting temperatures employed. Accordingly, in zinc retort manufacture certain special refractories and refractory admixtures have been adopted as standard practice.

Heretofore in the art it has also been customary to mold zinc retorts and condensers under pressure. Zinc retorts are customarily formed by extrusion and highly specialized extrusion apparatus has been developed for this purpose. Inasmuch as the specific apparatus used does not enter into the present invention, such apparatus as is used need not be described in detail.

In molding zinc retorts by extrusion it is customary to form the refractory materials into a plastic mass, insert the mass into the extrusion apparatus, and to apply pressure thereto to extrude therefrom the cartridge-shaped container. Thereafter the pressure molded so-called "green"

container is carefully dried until all of the moisture has been removed and is then fired to the proper fritting or sintering temperature to prepare it for service as a retort.

The refractory materials utilized in manufacturing zinc retorts by extrusion comprise in general plastic clay and silica sand with or without additions of prefired clay (grog or chamotte), carbonaceous material or other desirable inert refractories. American practice based on long experience dictates the use of the so-called St. Louis clay as the plastic clay component of the refractory admixture due to its favorable fritting temperature. In Europe and in other communities other types of plastic clays have been used. Typical refractory admixtures adapted to form zinc retorts by extrusion methods in accordance with American practice are as follows:

(1) 48 parts (by wt.) St. Louis clay, dry and crushed to pass 10 mesh.
52 parts (by wt.) grog or chamotte, dry and crushed to pass 8 mesh.

(2) 48 parts (by wt.) St. Louis clay, dry and crushed to pass 10 mesh.
26 parts (by wt.) silica sand, dry and crushed to pass 100 mesh.
26 parts (by wt.) burned clay or grog (from St. Louis clay or flint clay) and crushed to pass 8 mesh.

(3) 48 parts (by wt.) St. Louis clay, dry and crushed through 10 mesh.
15 parts (by wt.) silica sand, dry and crushed through 100 mesh.
26 parts (by wt.) grog, dry and crushed through 8 mesh.
11 parts (by wt.) metallurgical coke, dry and crushed through 10 mesh.

I do not propose to substantially alter the above noted preferred refractory admixtures in the practice of the present invention but propose to add thereto or to incorporate therewith a proportion of hygroscopic salts to facilitate and to accelerate the drying of the pressure formed retort (or condenser) to beneficiate the molding process and/or to facilitate the glazing of the formed and dried article, in accordance with the above set forth objects.

Before further disclosing the present invention reference should be made to the accompanying drawing, wherein—

Figure 2:
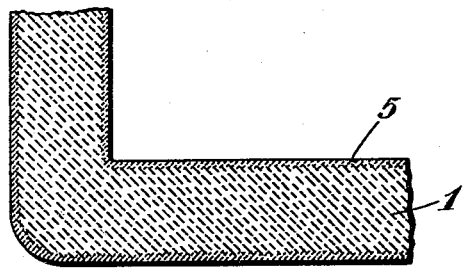

Fig. 1 is a sectional side elevation view of a portion of a zinc retorting furnace, disclosing a zinc retort and a zinc condenser, and illustrating the method of mounting the retort and condenser within the furnace; and Fig. 2 is a fragmentary sectional view of a retort illustrating one of the advantageous features of the present invention.

Referring to the drawing, Fig. 1 illustrates a section of a retorting furnace showing the manner in which the retort 1 and condenser 2 is supported therein. In practice a plurality of such retorts and condensers are mounted as indicated in a single furnace so that they all may be heated to the desired temperature from a single heat source. It is to be noted that the retort 1 is supported at each end by inner and outer walls 3 and 4, respectively.

In Fig. 2 an enlarged fragmentary section of the retort is shown in which the penetration of glazed surface 5 within the refractory material comprising retort 1 is illustrated.

In the practice of the present invention it is proposed as above noted to use the same admixtures of refractory materials which the prior art has found serviceable for zinc retort purposes. It is also proposed to add a proportion of hygroscopic salt to these admixtures of refractory materials in such manner as to facilitate the drying out of the same. It is further proposed to add these salts during the forming of the plastic admixture prior to extruding the retort to facilitate the forming of the plastic admixture. And it is still further proposed to comprise the salt at least in part of such hygroscopic salts as are adapted to form low melting glazes with the refractory materials comprising the retort during the firing operation all as will be more fully hereinafter disclosed.

The specific hygroscopic salt or admixture of salts utilized in the present invention may be widely varied. Where it is desired only to facilitate and to accelerate the drying out of the pressure formed article, one type or group is available. These must be adapted to be vaporized at elevated temperatures without deleterious interaction with the refractory materials comprising the article. Where it is desired that the salts perform the dual function of accelerating the drying and of glazing the surface, a different group of salts may be utilized. Any selection of materials within either group may be made on the basis of ready availability, cheapness, hygroscopicity and solubility (in aqueous or organic solvents) etc.

As examples of the type of salt contemplated as being within the scope of the present invention the following may be mentioned:—

Alkali metal chlorides (sodium, potassium, etc.); alkaline earth metal chlorides (calcium, barium, etc.); iron chloride; magnesium, iron and the like sulfates; sal ammoniac; some carbonate compounds; double chloride salts ($NaCl.KCl$; $3ZnCl_2.NH_4Cl$), borax, etc.

Preferably in accordance with the preferred mode of practicing the present invention to obtain the dual function noted, the above salts are selected and admixed with each other in varying proportions to give a hygroscopic composition of desired glazing characteristics such as for example, as follows:

*Admixture #1*

| | Per cent |
|---|---|
| $FeCl_3$ | .25 |
| NaCl | .25 |
| $CaCl_2$ | .25 |
| $3ZnCl_2$—$NH_4Cl$ | 1.25 |

*Admixture #2*

| | Per cent |
|---|---|
| Copperas | .50 |
| NaCl | .50 |
| Borax | .25 |

In manufacturing a retort in accordance with the present invention I prefer to add from 1 to 2½% (dry weight) of the above admixtures of salts to the admixture of refractory materials during the forming of the plastic mass adapted to be extruded.

The addition of the salt to the refractory admixture may be accomplished in different ways but I have found that it is preferable to first form a highly concentrated solution of the salt and to add this solution to the weighed refractory ingredients as they are fed into a pug mill where they are to be intimately admixed with water into a plastic mass of the desired degree of plasticity. Additional amounts of water may be added in order to obtain the desired degree of plasticity in the mass.

The addition of the salt solution during the forming of the plastic admixture is preferred for two reasons. The first reason is that by being disseminated throughout the entire plastic mass, during the subsequent drying operation it is assured that all parts of the retort will be subjected to the action of the hygroscopic salts during drying. Where the salt is applied to the surface of the retort (as a liquid or powder) after forming it would not be assured that all parts of the retort would be uniformly acted upon by the salt. Therefore variable and inefficient results would be obtained.

The second reason is that the addition of the salt to the plastic mass serves as a dispersing agent to the colloidal and finely divided particles of the refractory admixture, thereby serving to reduce the total amount of water necessary to add to obtain the desired degree of plasticity in the admixture. This in itself would serve to shorten the time interval required to obtain complete removal of moisture during drying.

The plastic mass thus obtained in practice usually contains a larger water content than is desired for best extrusion results, and moreover this water content is not generally distributed uniformly throughout the mass. It is, therefore, customary to permit this first plastic admixture to stand for 8 or more days in a room to permit the mass to age, during which interval the moisture content uniformly distributes itself by capillary action throughout the mass and the loss by evaporation reduces the percentage of moisture to the approximate amount desired. The addition of hygroscopic salts to the plastic mass serves to shorten this aging period due to the more uniform distribution of moisture in the plastic mass and the lower amount thereof added.

The aged plastic mass is again fed into a pug mill and intimately admixed. From the second pug mill it is fed directly into the extrusion press from which the desired size and shape retort is extruded. Ordinarily a retort of the type herein described weighs about 125 pounds, and has a length approximating 53½ inches (outside) and 52 inches (inside) with an inside diameter approximating 8¾ inches and an outside diameter approximating 11 inches.

Following the extruding operation the "green" retort is placed in an hermetically sealed dry room for seven or more days without any artificial heating or air circulation. Very gradual and progressively increased artificial heating with carefully regulated air circulation is then applied to the retort until the desired degree of dryness has been obtained in the retort.

During the drying operation the hygroscopic salts tend to accumulate upon the inner and outer surfaces of the retort. This deposit of salt by reason of its hygroscopic nature tends to draw moisture from the body of the retort to replace that which is given up to the circulating dry air, until ultimately the moisture supply is exhausted. Thereafter, the salt deposit is itself dehydrated. When the retort is fired or burned to elevated temperatures after the drying is complete to frit or sinter the refractory particles together, those salts which are vaporizable are driven off and those salts which are adapted to react with the refractory materials to form low fusing glazing compounds (aluminates, silicates, etc.) are caused to react and the resultant glazed retort is then ready for service. The usual firing temperature approximates 1000° C.

One characteristic of the glazed coating is illustrated in Fig. 2 wherein the glazed coating 5 is shown as being penetrative in nature and as being not merely a coating lying upon the surface as in prior art glazed coatings. This is a natural result of the manner in which the hygroscopic salts are brought to the surface of the retort during drying. This penetration of the glaze extends interiorly a material distance approximating from $\frac{1}{16}$ to $\frac{3}{32}$ inches.

Heretofore in the art it has been customary to apply the glazing compounds to the surface of the retort by spraying or painting the same thereon either after the retort has been dried or after it has been fired. In either case the degree of penetration of the coating into the retort surface is negligible and one of the chief deleterious characteristics of such a coating is its likelihood of chipping or scaling. The glazed surface of the present invention being penetrative in nature is tenaciously retained and is substantially free from such deleterious chipping and scaling. The finished retort thus produced therefore is superior to those heretofore produced by prior art processes.

While I have disclosed the adaptation of the present invention to the manufacture of zinc retorts, it is apparent that the same invention may be applied with equally beneficial results to the manufacture of zinc condensers or to crucibles or to other refractory articles wherein the same problems of drying or of drying and suitably glazing are present. While I have also disclosed pressure molding by extrusion it is apparent that other types of pressure molding may be utilized in the forming of refractory articles where the desired shape and configuration of the article is not adapted to extrusion molding.

It is also apparent that many modifications and adaptations of the present invention can be made without departing essentially from the nature and scope thereof as may be encompassed within the following claims:

What I claim is:

1. In the drying of pressure molded articles comprised of plastic refractories, by the circulating of air thereover at slowly rising temperatures, the method of facilitating and/or accelerating the removal of moisture from said article which comprises surfacing the article with hygroscopic salts.

2. In the drying of pressure molded articles comprised of plastic refractories, by the circulating of air thereover at slowly rising temperatures, the method of facilitating and/or accelerating the removal of moisture from said article which comprises incorporating within the plastic refractory a proportion of hygroscopic salts.

3. The method of forming a surface coating of glazing materials upon the surface of pressure molded refractory articles which comprises incorporating within the plastic admixture from which the article is to be formed, a proportion of hygroscopic salts comprised at least in part of constituents adapted to react with the said refractory material at elevated temperatures to form the desired glaze, pressure molding the admixture to the desired size, shape and configuration and drying the pressure molded article with circulating air at slowly rising temperatures.

4. In the manufacture of glazed pressure molded refractory articles the method of obtaining said glaze which comprises incorporating within the refractory material from which the said article is to be formed a proportion of a hygroscopic salt admixture adapted at least in part to react with the refractory material at elevated temperatures to form the said glaze, molding the article, air drying the molded article at slowly rising temperatures to bring the said salt to the surface of the air dried article and thereafter firing the article at elevated temperatures to consolidate and to form the said glaze.

5. The method of manufacturing pressure molded refractory articles which comprises forming a plastic admixture comprised of refractory materials, incorporating therein a proportion of hygroscopic salt, pressure molding the admixture to the desired size, shape and configuration, air drying the molded article at slowly rising temperatures and then firing the air dried article to the required fritting temperature to consolidate.

6. The method of manufacturing pressure molded refractory articles which comprises forming a plastic admixture comprised of refractory materials, incorporating therein a proportion of hygroscopic salt, a proportion of which salt is adapted to react with the said refractory material at elevated temperatures to form therewith a suitable glaze, pressure molding the admixture to the desired size, shape and configuration, air drying the molded article at slowly rising temperatures and then firing the air dried article to the required fritting temperature to consolidate and to form said glaze.

7. The method of manufacturing pressure molded refractory articles which comprises forming a plastic admixture comprised of refractory materials, pressure molding said plastic admixture to the desired size, shape and configuration, surfacing said article with hygroscopic salts, air drying the surfaced article at slowly rising temperatures and then firing the air dried article to the required fritting temperature to consolidate.

8. The method of manufacturing zinc retorts, zinc condensers, crucibles and the like which comprises forming a plastic mass comprised of the desired refractory materials, incorporating therein a proportion of hygroscopic salt, pressure molding the plastic admixture to the desired size, shape and configuration, air drying the molded article at slowly rising temperatures and then firing to the required fritting temperature to consolidate.

9. The method of manufacturing zinc retorts, zinc condensers, crucibles and the like which comprises forming a plastic mass comprised of the desired refractory materials, incorporating therein a proportion of hygroscopic salt adapted at least in part to react with the said refractory materials at elevated temperatures to form therewith a suitable glaze, pressure molding the plastic admixture to the desired size, shape and configuration, air drying the molded article at slowly rising temperatures and then firing to the required fritting temperature to consolidate and to form the said glaze.

10. The method of manufacturing zinc retorts which comprises intimately admixing plastic clay, silica sand, burned clay and water in the desired relative proportions, to give a plastic mass adapted to be pressure molded, incorporating therein a proportion of hygroscopic salt, pressure molding said plastic mass by extrusion into the desired size, shape and configuration for the said retort, air drying the said extruded article at slowly rising temperatures and then firing to the required fritting temperature to consolidate.

11. The method of manufacturing zinc retorts which comprises intimately admixing plastic clay, silica sand, burned clay and water in the desired relative proportions, to give a plastic mass adapted to be pressure molded, incorporating therein from 1 to $2\frac{1}{2}\%$ of a hygroscopic salt admixture comprising $FeCl_3$, $NaCl$, $CaCl_2$ and $3ZnCl_2.NH_4Cl$ in their desired relative proportions, pressure molding said plastic mass by extrusion into the desired size, shape and configuration for the said retort, air drying the said extruded article at slowly rising temperatures and then firing to the required fritting temperature to consolidate and to cause the hygroscopic salts surfacing the article to interact therewith to form a glaze.

12. A hygroscopic glazing and drying composition for refractory articles comprised in major part of plastic clay and silica sand, which comprises $FeCl_3$, $NaCl$, $CaCl_2$ and $3ZnCl_2.NH_4Cl$ admixed together in their desired relative proportions.

13. As an article of manufacture, a plastic admixture of refractory materials including a proportion of a hygroscopic salt the said admixture being adapted to be pressure molded into a desired size, shape and configuration.

14. As an article of manufacture a pressure molded article comprised of refractory materials incorporating therein a proportion of a hygroscopic salt.

15. As an article of manufacture a pressure molded article comprised of refractory materials surfaced with hygroscopic salts.

16. As an article of manufacture a pressure molded article comprised of refractory materials surfaced with hygroscopic salts, a proportion of which salts are adapted to react with the said refractory materials at elevated temperatures to form a glaze.

17. As an article of manufacture a zinc retort comprised of refractory materials surfaced with a glaze penetrating interiorly from the surface of the retort.

18. As an article of manufacture a zinc retort comprised mainly of clay and silica sand fritted together and surfaced with a glaze penetrating interiorly from the surface of the retort.

AUGUSTIN LEON JEAN QUENEAU.